US011481605B2

(12) United States Patent
Nguyen et al.

(10) Patent No.: US 11,481,605 B2
(45) Date of Patent: Oct. 25, 2022

(54) 2D DOCUMENT EXTRACTOR

(71) Applicant: Element AI Inc., Montreal (CA)

(72) Inventors: Olivier Nguyen, Montreal (CA); Archy De Berker, Montreal (CA); Eniola Alese, Montreal (CA); Majid Laali, Montreal (CA)

(73) Assignee: ServiceNow Canada Inc., Montreal (CA)

(*) Notice: Subject to any disclaimer, the term of this patent is extended or adjusted under 35 U.S.C. 154(b) by 542 days.

(21) Appl. No.: 16/663,926

(22) Filed: Oct. 25, 2019

(65) Prior Publication Data
US 2021/0125034 A1    Apr. 29, 2021

(51) Int. Cl.
*G06N 3/04* (2006.01)
*G06N 3/08* (2006.01)
*G06K 9/62* (2022.01)
*G06V 10/44* (2022.01)
*G06V 30/194* (2022.01)

(52) U.S. Cl.
CPC ......... *G06N 3/0454* (2013.01); *G06K 9/6267* (2013.01); *G06N 3/0445* (2013.01); *G06N 3/08* (2013.01); *G06V 10/454* (2022.01); *G06V 30/194* (2022.01); *G06T 2207/20084* (2013.01)

(58) Field of Classification Search
CPC .. G06V 10/454; G06V 30/194; G06N 3/0454; G06N 3/0445; G06N 3/08; G06N 20/202; G06K 9/6267; G06T 2207/20084
See application file for complete search history.

(56) References Cited

U.S. PATENT DOCUMENTS

| 8,788,930 B2 | 7/2014 | Barrus |
| 9,588,960 B2 | 3/2017 | Nekhay |
| 9,659,213 B2 | 5/2017 | Venkatachalam et al. |
| 10,049,096 B2 | 8/2018 | Deepak et al. |

(Continued)

FOREIGN PATENT DOCUMENTS

| EP | 1598770 A2 | 11/2005 |
| WO | 2016197381 A1 | 12/2016 |
| WO | 2018067978 A1 | 4/2018 |

OTHER PUBLICATIONS

Smith, "Deep Learning OCT using TensorFlow and Python", https://nicholastsmith.wordpress.com/2017/10/14/deep-learning-ocr-using-tensorflow-and-python/, Oct. 14, 2017.

*Primary Examiner* — Daniel G Mariam
(74) *Attorney, Agent, or Firm* — Serge Lapointe

(57) ABSTRACT

There is provided a 2D document extractor for extracting entities from a structured document, the 2D document extractor includes a first convolutional neural network (CNN), a second CNN, and a third recurrent neural network (RNN). A plurality of text sequences and structural elements indicative of location of the text sequences in the document are received. The first CNN encodes the text sequences and structural elements to obtain a 3D encoded image indicative of semantic characteristics of the text sequences and having the structure of the document. The second CNN compresses the 3D encoded image to obtain a feature vector, the feature vector being indicative of a combination of spatial characteristics and semantic characteristics of the 3D encoded image. The third RNN decodes the feature vector to extract the text entities, a given text entity being associated with a text sequence.

20 Claims, 5 Drawing Sheets

(56) References Cited

U.S. PATENT DOCUMENTS

| | | |
|---|---|---|
| 10,176,159 B2 | 1/2019 | Vohra et al. |
| 10,268,883 B2 | 4/2019 | Sarkar et al. |
| 10,354,168 B2 | 7/2019 | Bluche |
| 10,366,163 B2 | 7/2019 | Chen et al. |
| 10,380,236 B1 | 8/2019 | Ganu et al. |
| 2017/0052950 A1 | 2/2017 | Danielyan et al. |
| 2017/0147552 A1 | 5/2017 | Carroll |
| 2018/0033147 A1 | 2/2018 | Becker et al. |
| 2018/0082443 A1 | 3/2018 | Risman et al. |
| 2018/0137349 A1 | 5/2018 | Such et al. |
| 2018/0267958 A1 | 9/2018 | Danielyan et al. |
| 2019/0019021 A1 | 1/2019 | Hassanzadeh et al. |
| 2019/0147239 A1 | 5/2019 | Jin et al. |
| 2019/0180154 A1 | 6/2019 | Orlov et al. |
| 2019/0286899 A1 | 9/2019 | Wyle et al. |
| 2019/0385001 A1* | 12/2019 | Stark ................... G06N 3/0445 |
| 2021/0011974 A1* | 1/2021 | An ........................ G06N 3/082 |

\* cited by examiner

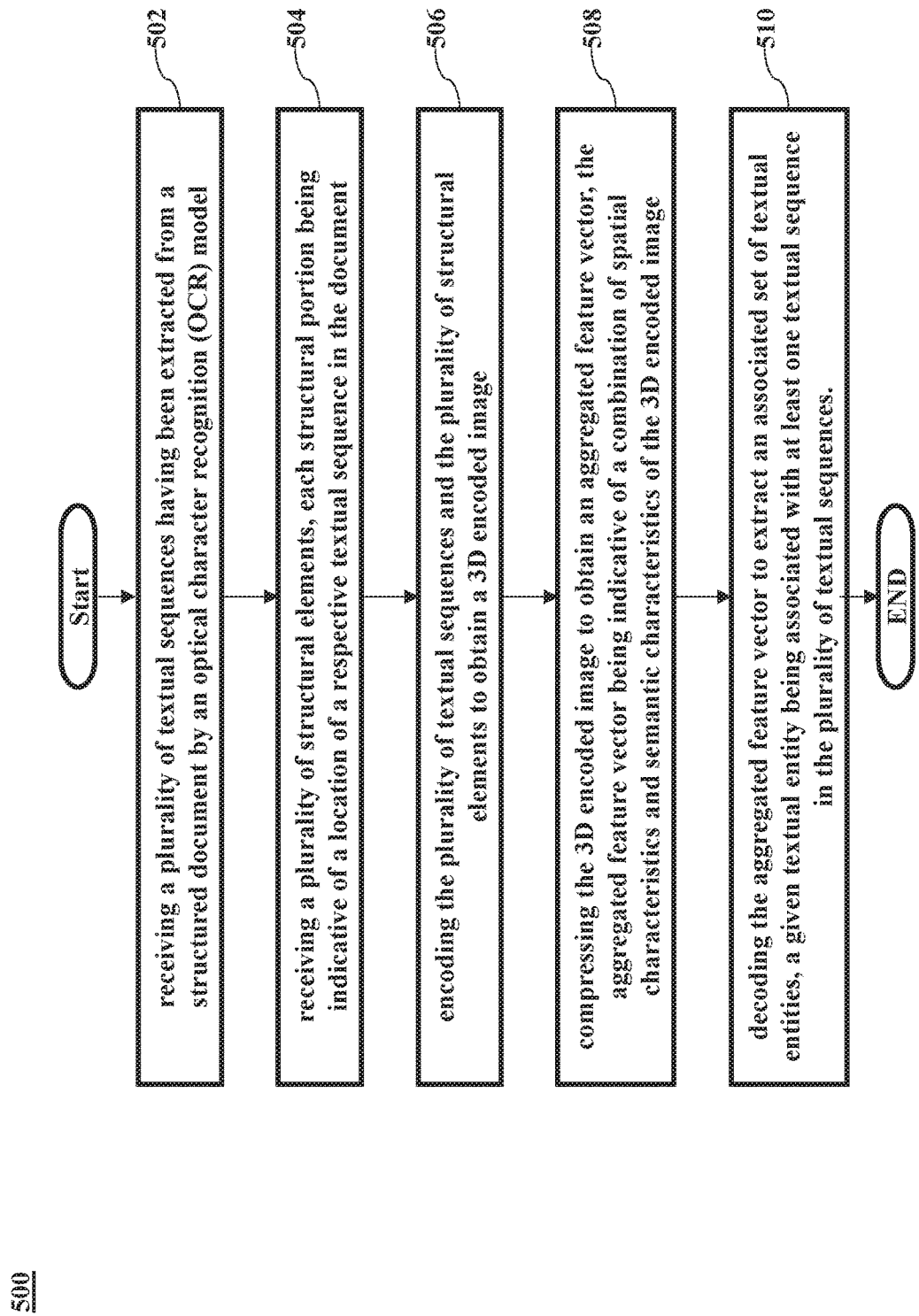

2D DOCUMENT EXTRACTOR

CROSS-REFERENCE TO RELATED APPLICATIONS

None

FIELD

The present technology relates to machine learning algorithms in general and more specifically to methods and systems for extracting textual entities from structured documents using machine learning algorithms (MLAs).

BACKGROUND

Optical Character Recognition (OCR) is widely used as a form of information entry in digital format. More specifically, OCR is concerned with the extraction of text from images, such as printed pages from books, random images with graffitis, handwritten notes containing doodles, street signs, receipts, forms and the like.

While OCR has evolved extensively due to advances in the field of artificial intelligence, OCR has been proven to work well only in specific cases. OCR remains a challenging task for extracting information from structured documents due to factors such as text density in the image, text structure in the image, fonts, character types, artifacts and location.

While computer vision algorithms, which use 2D information in the visual domain, have been proven to be useful by extracting and exploiting correlations between neighboring pixels of an image, these approaches are not optimal for understanding textual content and semantics due to their visual content driven nature.

With the advancement of techniques in machine learning, and more specifically deep learning, a type of artificial neural network, generalization of OCR tasks has become possible. However, improvements to current techniques are still needed.

For example, a business organization such as a law firm or an insurance company needs accurate digital representations of text in structured documents such as forms, receipts and other official papers, as errors may not only be costly to the organization and the implicated parties but may also be a question of life or death in some instances.

There is also a need to extract specifies entities from those documents, e.g. content of specific fields. However, manually verifying the digitized information would be time-consuming and costly due to the sheer number of documents that need to be analyzed, as well as their varying structures.

One of the main problems in rapidly converting paper forms to adaptive forms is to identify the structure and semantics of form documents from an image or image-like format.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

The present technology arises from an observation by the developer(s) that a neural network architecture used in image segmentation applications could be modified for processing and understanding structured document.

Developer(s) of the present technology have appreciated that an encoder-decoder architecture including neural networks could be used not only to obtain more accurate text representations from an image, but also gain an understanding of the structural and semantic relation between textual sequences in the document.

The present technology enables extracting entities (e.g. names, addresses, dates) from documents having a 2D structure that contain textual information with spatial organization (e.g. resulting from an OCR system), where for each entity requested, the present technology enables finding text associated with it. Thus, for a given image, specific entities and associated textual information could be extracted.

Thus, embodiments of the present technology are directed to a 2D document extractor.

In accordance with a broad aspect of the present technology, there is provided a computer-implemented method for extracting textual entities from a structured document, the method being executable by a server, the server executing a plurality of machine learning algorithms (MLAs) comprising a first MLA, a second MLA, and a third MLA. The method comprises: receiving, by the server, a plurality of text sequences having been extracted from an image by an optical character recognition (OCR) model having processed the image to generate the structured document, receiving, by the server, a plurality of structural elements, each structural element being indicative of a location of a respective text sequence of the plurality of text sequences in the structured document, encoding, by the first MLA, the plurality of text sequences and the plurality of structural elements to obtain a 3D encoded image, the 3D encoded image being indicative of semantic characteristics of the plurality of text sequences, the 3D encoded image having a spatial structure of the structured document, compressing, by the second MLA, the 3D encoded image to obtain an aggregated feature vector, the aggregated feature vector being indicative of a combination of spatial characteristics and semantic characteristics of the 3D encoded image, and decoding, by the third MLA, the aggregated feature vector to extract an associated set of textual entities, a given textual entity being associated with at least one text sequence in the plurality of text sequences.

In some embodiments of the method, the first MLA comprises a first convolutional neural network (CNN), the second MLA comprises a second CNN, and the third MLA comprises a third recurrent neural network (RNN).

In some embodiments of the method, the first CNN comprises a 1D CNN, and the second CNN comprises a 2D CNN.

In some embodiments of the method, the third RNN comprises a Long Term Short Memory (LSTM) Network.

In some embodiments of the method, a given 1D convolution layer in the first CNN generates, for a given text sequence in the structured document, a respective fixed-length embedding, the respective fixed-length embedding comprising a plurality of feature channels indicative of semantic characteristics of the given text sequence.

In some embodiments of the method, the 3D encoded image has a height corresponding to the height of the structured document, a width corresponding to a width of the structured document.

In some embodiments of the method, the first CNN rearranges the respective fixed-length embeddings based on the plurality of structured elements to obtain the 3D encoded image.

In some embodiments of the method, the method further comprises, prior to the receiving: training the first MLA, the second MLA, and the third MLA using stochastic gradient descent and back propagation.

In some embodiments of the method, the method comprises, prior to the encoding the plurality of text sequences: embedding the plurality of text sequences to obtain at least one of: character embeddings and word embeddings of the plurality of text sequences.

In some embodiments of the method, the method comprises, by the first MLA, the at least one of the character embeddings and word embeddings to generate fixed-length embeddings.

In some embodiments of the method, the method comprises training the third MLA on a per-character cross-entropy function.

In some embodiments of the method, the first CNN generates at least a portion of the encoding on a character-per-character basis.

In some embodiments of the method, the aggregated feature vector is indicative of high-level features and low-level features of the 3D encoded image.

In some embodiments of the method, the structured document comprises at least one of: a table, a list, a paragraph, and a field.

In some embodiments of the method, each structural element comprises coordinates of a bounding box, the bounding box comprising the respective text sequence.

In some embodiments of the method, the method further comprises, prior to the receiving the plurality of text sequences: extracting, from the document via the OCR model, the plurality of text sequences.

In accordance with a broad aspect of the present technology, there is provided a server for extracting textual entities from a structured document, the server having access to a plurality of machine learning algorithms (MLAs) comprising a first MLA, a second MLA, and a third MLA, the server comprising: a processor, a computer-readable storage medium connected to the processor, the computer-readable storage medium comprising instructions, the processor, upon executing the instructions, being configured for: receiving a plurality of text sequences having been extracted from the structured document by an optical character recognition (OCR) model having processed the image to generate the structured document, receiving a plurality of structural elements, each structural element being indicative of a location of a respective text sequence in the document, encoding, by the first MLA, the plurality of text sequences and the plurality of structural elements to obtain a 3D encoded image, the 3D encoded image being indicative of semantic characteristics of the plurality of text sequences, the 3D encoded image having a spatial structure of the structured document, compressing, by the second MLA, the 3D encoded image to obtain an aggregated feature vector, the aggregated feature vector being indicative of a combination of spatial characteristics and semantic characteristics of the 3D encoded image, and decoding, by the third MLA, the aggregated feature vector to extract an associated set of textual entities, a given textual entity being associated with at least one text sequence in the plurality of text sequences.

In some embodiments of the server, the first MLA comprises a first convolutional neural network (CNN), the second MLA comprises a second CNN, and the third MLA comprises a third recurrent neural network (RNN).

In some embodiments of the server, the first CNN comprises a 1D CNN, and the second CNN is a 2D CNN.

In some embodiments of the server, the third RNN comprises a Long Term Short Memory (LSTM) Network.

In some embodiments of the server, a given 1D convolution layer in the first CNN generates, for a given text sequence in the structured document, a respective fixed-length embedding, the respective fixed-length embedding comprising a plurality of feature channels indicative of semantic characteristics of the given text sequence.

In some embodiments of the server, the 3D encoded image has a height corresponding to the height of the structured document, a width corresponding to a width of the structured document.

In some embodiments of the server, the first CNN rearranges the respective fixed-length embeddings based on the plurality of structured elements to obtain the 3D encoded image.

In some embodiments of the server, the processor is further configured for, prior to the receiving: training the first MLA, the second MLA, and the third MLA using stochastic gradient descent and back propagation.

In some embodiments of the server, the processor is further configured for, prior to the encoding the plurality of text sequences: embedding the plurality of text sequences to obtain at least one of: character embeddings and word embeddings of the plurality of text sequences.

In some embodiments of the server, the processor is further configured for pooling, by the first MLA, the at least one of the character embeddings and word embeddings to generate fixed-length embeddings.

In some embodiments of the server, processor is further configured for: training the third MLA on a per-character cross-entropy function.

In some embodiments of the server, the first CNN generates at least a portion of the encoding on a character-per-character basis.

In some embodiments of the server, the aggregated feature vector is indicative of high-level features and low-level features of the 3D encoded image.

In some embodiments of the server, the structured document comprises at least one of: a table, a list, a paragraph, and a field.

In some embodiments of the server, each structural element comprises coordinates of a bounding box, the bounding box comprising the respective text sequence.

In some embodiments of the server, the processor is further configured for, prior to the receiving the plurality of text sequences: extracting, from the document via the OCR model, the plurality of text sequences.

Definitions

Embedding

An embedding is a mapping of an object or variable to a vector of continuous numbers. Embeddings enable us to perform operations such as measuring a similarity between two objects in the embedding space. Applied to machine learning, embeddings are useful for reducing the dimensionality of categorical variables and meaningfully represent similarity between categories in the transformed space.

Machine Learning Algorithms (MLA)

A machine learning algorithm is a process or sets of procedures that helps a mathematical model adapt to data given an objective. A MLA normally specifies the way the feedback is used to enable the model to learn the appropriate mapping from input to output. The model specifies the mapping function and holds the parameters while the learning algorithm updates the parameters to help the model satisfy the objective.

MLAs may generally be divided into broad categories such as supervised learning, unsupervised learning and reinforcement learning. Supervised learning involves presenting a machine learning algorithm with training data consisting of inputs and outputs labelled by assessors, where the objective is to train the machine learning algorithm such that it learns a general rule for mapping inputs to outputs. Unsupervised learning involves presenting the machine learning algorithm with unlabeled data, where the objective is for the machine learning algorithm to find a structure or hidden patterns in the data. Reinforcement learning involves having an algorithm evolving in a dynamic environment guided only by positive or negative reinforcement.

Models used by the MLAs include neural networks (including deep learning), decision trees, support vector machines (SVMs), Bayesian networks, and genetic algorithms.

Neural Networks (NNs)

Neural networks (NNs), also known as artificial neural networks (ANNs) are a class of non-linear models mapping from inputs to outputs and comprised of layers that can potentially learn useful representations for predicting the outputs. Neural networks are typically organized in layers, which are made of a number of interconnected nodes that contain activation functions. Patterns may be presented to the network via an input layer connected to hidden layers, and processing may be done via the weighted connections of nodes. The answer is then output by an output layer connected to the hidden layers.

Multilayer Perceptron (MLP)

A multilayer perceptron (MLP) is a class of feedforward artificial neural networks. A MLP consists of at least three layers of nodes: an input layer, a hidden layer and an output layer. Except for the input nodes, each node is a neuron that uses a nonlinear activation function. A MLP uses a supervised learning technique called backpropagation for training. A MLP can distinguish data that is not linearly separable.

Convolutional Neural Network (CNN)

A convolutional neural network (CNN or ConvNet) is a NN which is a regularized version of a MLP. A CNN uses convolution in place of general matrix multiplication in at least one layer.

Recurrent Neural Network (RNN)

A recurrent neural network (RNN) is a NN where connection between nodes form a directed graph along a temporal sequence. This allows it to exhibit temporal dynamic behavior. Each node in a given layer is connected with a directed (one-way) connection to every other node in the next successive layer. Each node (neuron) has a time-varying real-valued activation. Each connection (synapse) has a modifiable real-valued weight. Nodes are either input nodes (receiving data from outside the network), output nodes (yielding results), or hidden nodes (that modify the data en route from input to output).

In the context of the present specification, a "character" is a single symbol in a predefined, finite alphabet of characters (e.g., all or a subset of the ASCII character set). No character in the alphabet includes more than one symbol. A "word" includes a set of characters drawn from the alphabet, and although some words may consist of a single character, at least some of the words in dialog act or a text sequence include at least two, or at least three, or at least four of the characters. As defined herein, "words" can include number sequences, punctuation, and the like, and need not be defined in a dictionary. A "text sequence" is a sequence of words and while some text sequences may consist of a single word, at least some text sequences include at least two, or at least three, or at least four words.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 5 depicts a flow chart of a method of extracting text entities from an image in accordance with non-limiting embodiments of the present technology.

DETAILED DESCRIPTION

Figure 1:
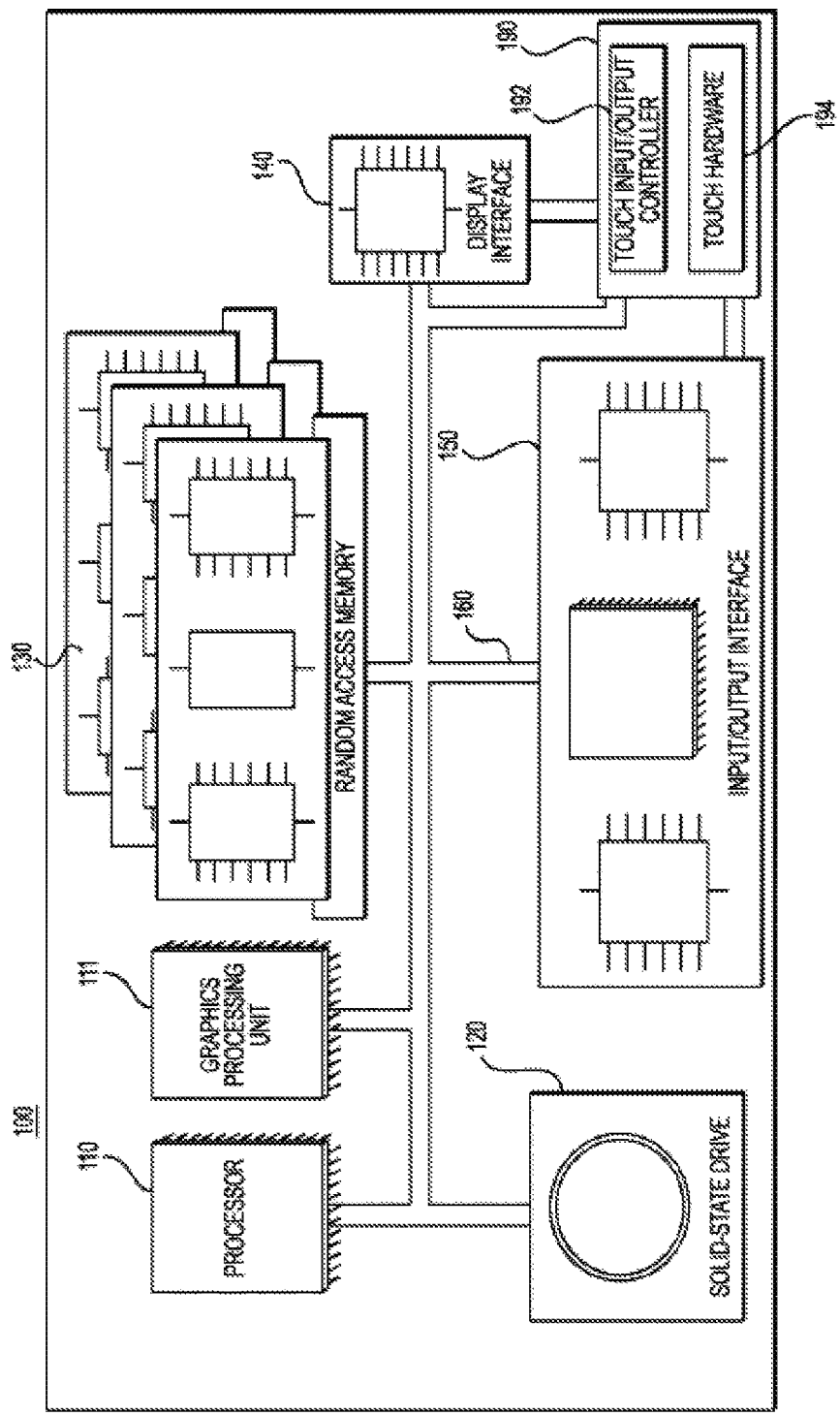
FIG. 1 depicts a schematic diagram of an electronic device in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and nonvolatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Electronic Device

Referring to FIG. 1, there is shown an electronic device 100 suitable for use with some implementations of the present technology, the electronic device 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the electronic device 100 in addition or in replacement of the touchscreen 190.

According to implementations of the present technology, the solid-state drive 120 stores program instructions suitable for being loaded into the random-access memory 130 and executed by the processor 110 and/or the GPU 111 for generating a reduced molecular graph of a given molecule. For example, the program instructions may be part of a library or an application.

The electronic device 100 may be implemented as a server, a desktop computer, a laptop computer, a tablet, a smartphone, a personal digital assistant or any device that may be configured to implement the present technology, as it may be understood by a person skilled in the art.

System

Figure 2:
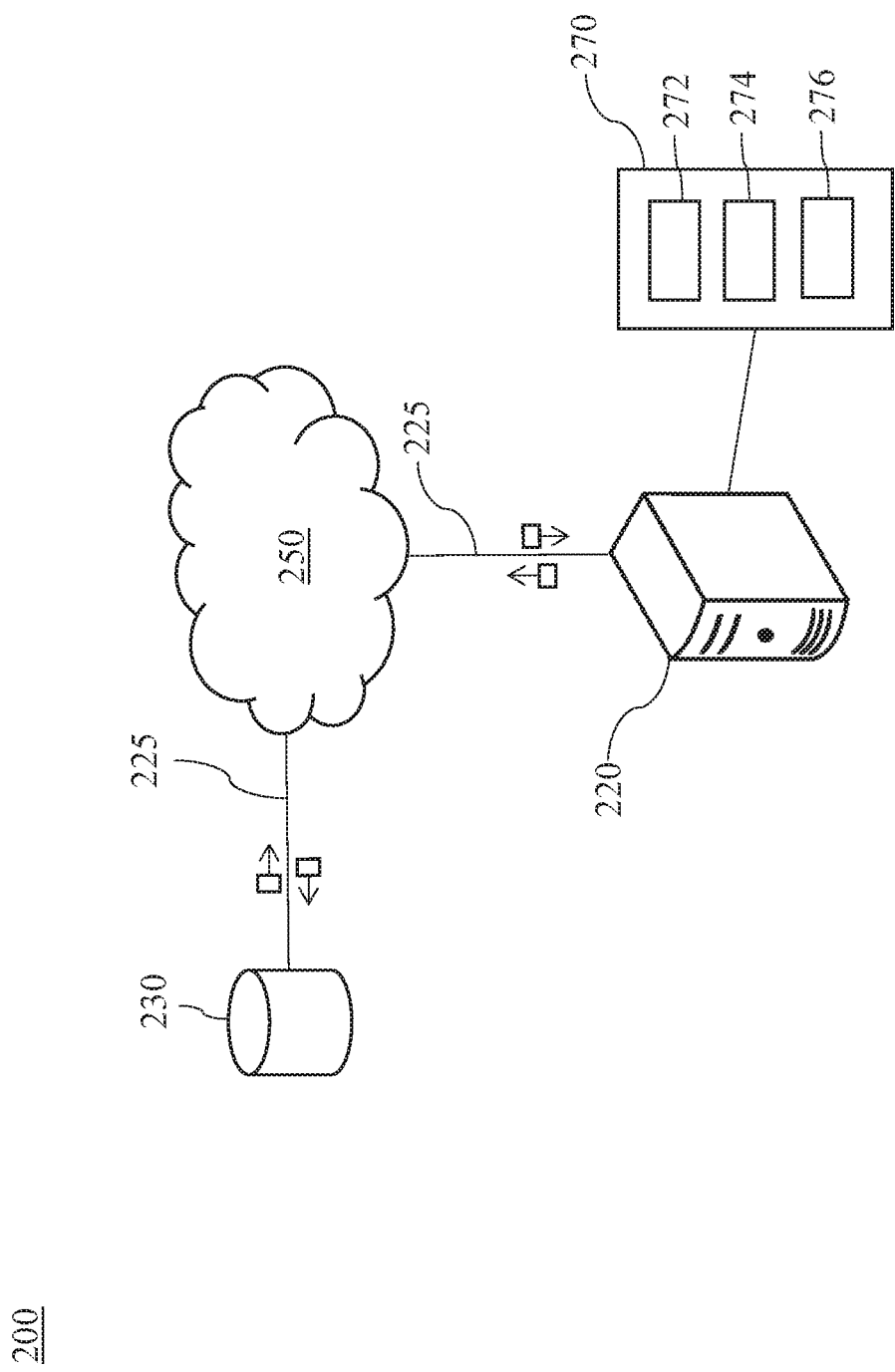
FIG. 2 depicts a schematic diagram of a system in accordance with non-limiting embodiments of the present technology.

Referring to FIG. 2, there is shown a schematic diagram of a system 200, the system 200 being suitable for implementing non-limiting embodiments of the present technology. It is to be expressly understood that the system 200 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 200 may provide in certain instances simple implementations of the present technology, and that where such is the case they have been presented in this manner as an aid to understanding. As persons skilled in the art would understand, various implementations of the present technology may be of a greater complexity.

The system 200 comprises inter alia a server 220 connected to a database 230 over a communications network 250.

Server

Generally speaking, the server 220 is configured to extract textual entities from an image, the image having text content. How the server 220 is configured to do so will be explained in more detail herein below.

The server 220 can be implemented as a conventional computer server and may comprise some or all of the features of the electronic device 100 depicted in FIG. 1. In a non-limiting example of an embodiment of the present technology, the server 220 can be implemented as a Dell™ PowerEdge™ Server running the Microsoft™ Windows Server™ operating system. Needless to say, the server 220 can be implemented in any other suitable hardware and/or software and/or firmware or a combination thereof. In the depicted non-limiting embodiment of present technology, the server 220 is a single server. In alternative non-limiting embodiments of the present technology, the functionality of the server 220 may be distributed and may be implemented via multiple servers (not depicted).

The implementation of the server 220 is well known to the person skilled in the art of the present technology. However, briefly speaking, the server 220 comprises a communication interface (not depicted) structured and configured to communicate with various entities (such as the database 230, for example and other devices potentially coupled to the network) via the network. The server 220 further comprises at least one computer processor (e.g., the processor 110 of the electronic device 100) operationally connected with the communication interface and structured and configured to execute various processes to be described herein.

The server 220 has access to a plurality of machine learning algorithms (MLA) 270.

Machine-Learning Algorithms

The plurality of MLAs 270 comprises inter alia a first MLA 272, a second MLA 274, and a third MLA 276.

Figure 3:
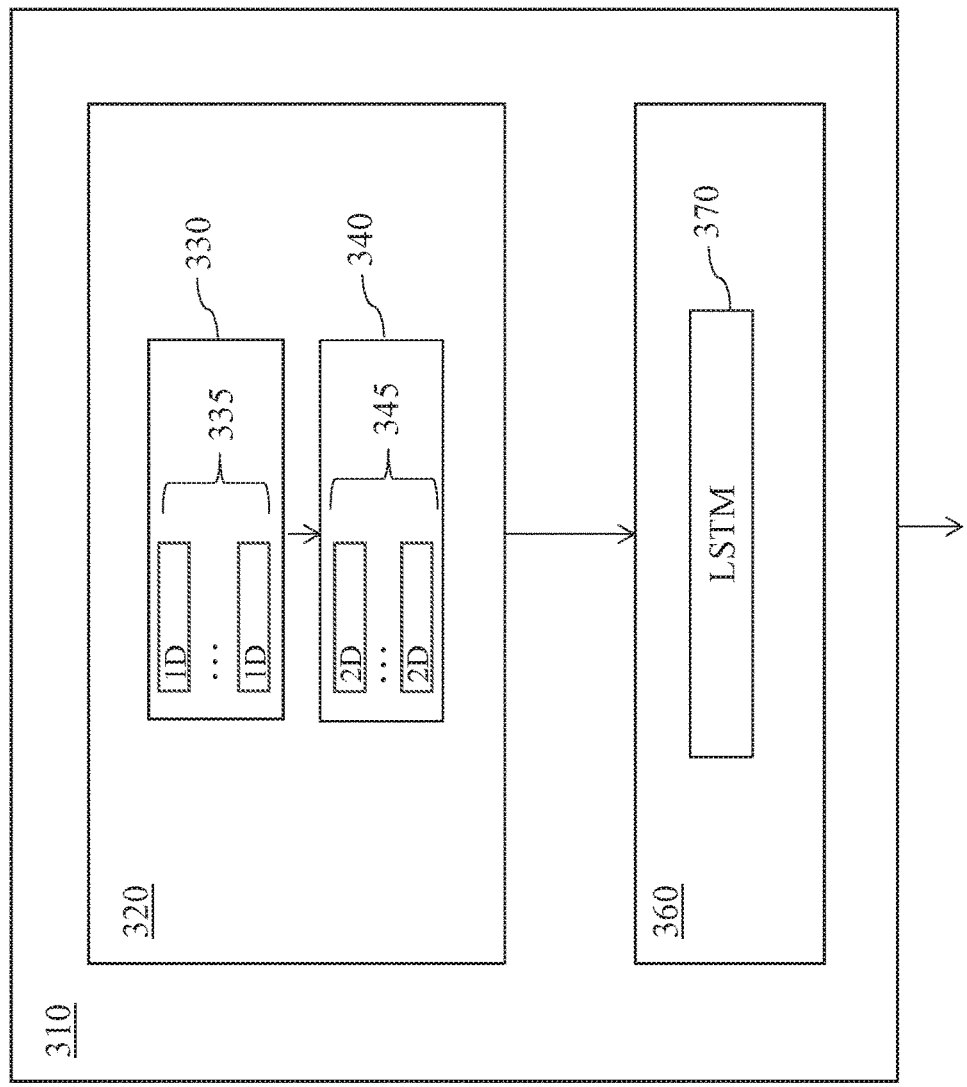
FIG. 3 depicts a schematic diagram of a 2D document extractor in accordance with non-limiting embodiments of the present technology.

In one embodiment, the first MLA 272 is a first CNN 330 (only depicted in FIG. 3), the second MLA 274 is a second CNN 340 (only depicted in FIG. 3) and the third MLA 276 is a RNN in the form of a LSTM Network 370 (only depicted in FIG. 3).

In one embodiment, the server 220 executes a training procedure of one or more of the plurality of MLAs 270. In another embodiment, the training procedure of one or more of the plurality of MLAs 270 may be executed by another electronic device (not depicted), and one or more of the plurality of MLAs 270 may be transmitted to the server 220 over the communications network 250.

Database

A database 230 is communicatively coupled to the server 220 via the communications network 250 but, in alternative implementations, the database 230 may be communicatively coupled to the server 220 without departing from the teachings of the present technology. Although the database 230 is illustrated schematically herein as a single entity, it is contemplated that the database 230 may be configured in a distributed manner, for example, the database 230 could have different components, each component being configured for a particular kind of retrieval therefrom or storage therein.

The database 230 may be a structured collection of data, irrespective of its particular structure or the computer hardware on which data is stored, implemented or otherwise rendered available for use. The database 230 may reside on the same hardware as a process that stores or makes use of the information stored in the database 230 or it may reside on separate hardware, such as on the server 220. Generally speaking, the database 230 may receive data from the server 220 for storage thereof and may provide stored data to the server 220 for use thereof.

In some embodiments of the present technology, the server 220 may be configured to store in the database 230 digital images, as well as OCR representations of the digital images comprising text sequences and structural elements of the text sequences. At least some information stored in the database 230 may be predetermined by an operator and/or collected from a plurality of external resources.

The database 230 may also configured to store information for training the plurality of MLAs 270, such as training datasets, which may include training objects such as digital images or documents with text sequences, textual elements as well as labels of the text sequences and/or structural elements.

Communication Network

In some embodiments of the present technology, the communications network 250 is the Internet. In alternative non-limiting embodiments, the communication network 250 can be implemented as any suitable local area network (LAN), wide area network (WAN), a private communication network or the like. It should be expressly understood that implementations for the communication network 250 are for illustration purposes only. How a communication link (not separately numbered) between the server 220, the database 230 and/or another electronic device (not depicted) and the communications network 250 is implemented will depend inter alia on how each electronic device is implemented.

2D Document Extractor

Figure 4:
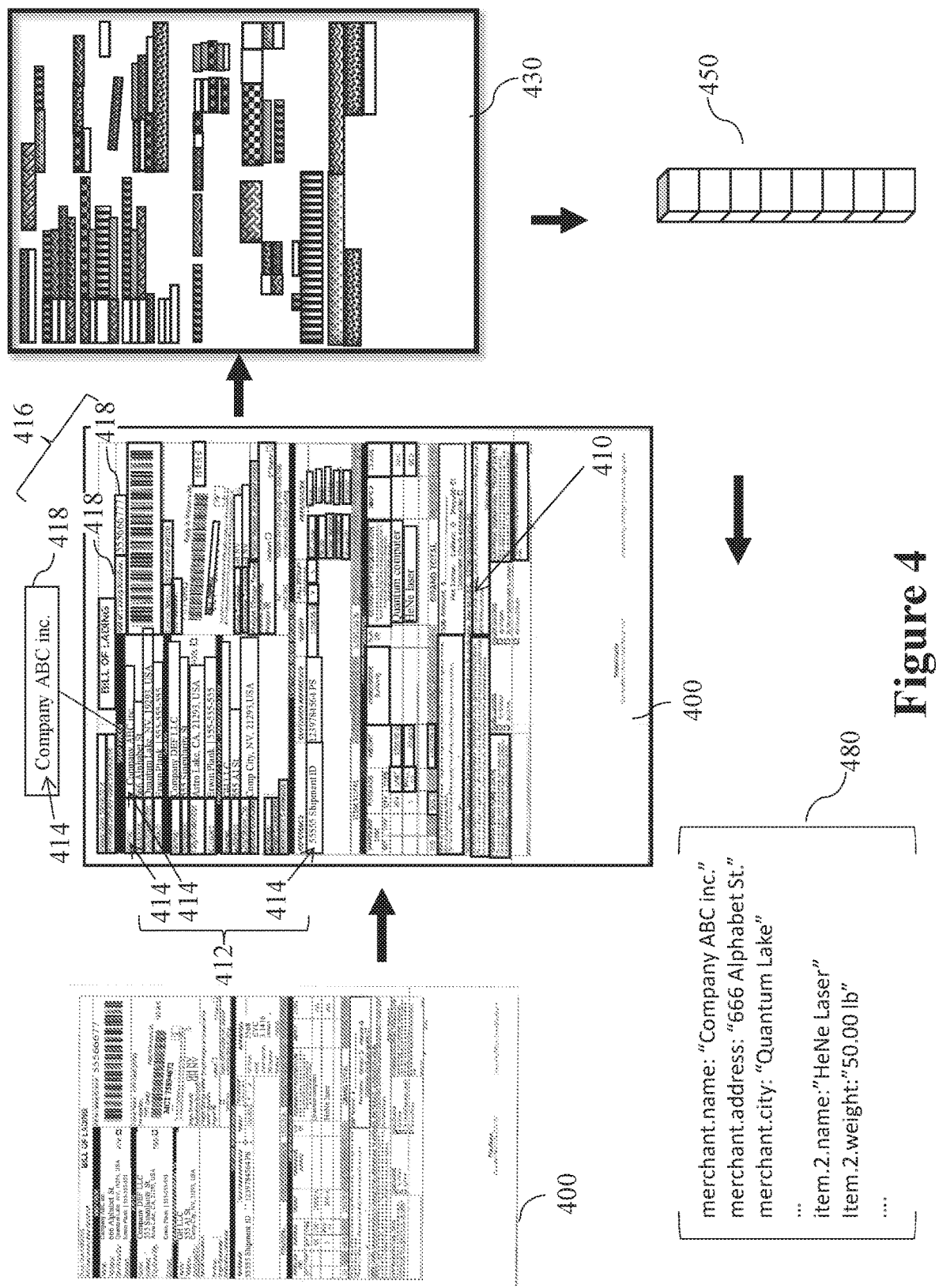
FIG. 4 depicts a schematic diagram of a plurality of inputs and outputs used by the 2D document extractor of FIG. 3 in accordance with non-limiting embodiments of the present technology.

With reference to FIG. 3 and FIG. 4, there is depicted a 2D document extractor 300 and inputs and outputs of the 2D document extractor 300 in accordance with non-limiting embodiments of the present technology.

In one embodiment, the server 220 executes the 2D document extractor 300. The 2D document extractor 300 comprises an encoder-decoder network 310, comprising an encoder or encoder network 320 and a decoder or decoder network 360.

Generally speaking, the 2D document extractor 300 is configured to: (i) receive as an input a structured document 400, the structured document 400 having generated by an OCR model (not depicted) from an image; and (ii) output a set of textual entities 480 extracted from the structured document 400.

The structured document 400 is generally a digital representation of a structured document, i.e. a document including text sequences disposed in a relatively organized manner. In one embodiment, text in the structured document 400 may be divided in sections, may be organized in hierarchies, may include lists, tables, paragraphs, flow charts, and fields. As a non-limiting example, the structured document 400 may be at least a portion of a receipt, an application form, a report, an official record, identity card, and the like.

As a non-limiting example, the structured document 400 may have been scanned, may have been photographed, or may have been computer generated to be represented in a digital format. It should be noted that the structured document 400 may be represented in a variety of digital formats such as, but not limited to EXIF, TIFF, GIF, JPEG, PDF and the like.

OCR may be performed on the structured document 400 by the server 220 or by another electronic device by executing one or more OCR models (not depicted) to extract a plurality of document parameters 410. The plurality of document parameters 410 may be stored in the database 230 for example. The nature of the OCR models that could be used is not limited. The one or more OCR models may comprise one or more MLAs. As a non-limiting example, the OCR model may be Tesseract OCR, pdf2text, and the like.

The plurality of document parameters 410 includes a plurality of text sequences 412 and a plurality of structural elements 416, where a given text sequence 414 in the plurality of text sequences 414 is associated with a respective structural element 418 of the plurality of structural elements 416. The respective structural element 418 is indicative of a location of the given text sequence 414 in the image. The plurality of documents parameters 410 may further include information indicative of a structure or spatial layout of the structured document 410. In one embodiment, the structural element 418 comprises a height and width of the image 400 in pixels.

A given text sequence 414 comprises one or more characters, and may be a number, a word, a sentence, or a paragraph for example. As a non-limiting example, the given text sequence 414 may comprise one or more of: "Name:" "John Doe"", "Address", "222", "m", "Baker Street", "City:", "London", "1".

A given structural element 418 is indicative of a location of the given text sequence 414 in the image 400. In one embodiment, the structural element 418 is a bounding box surrounding the given text sequence 414. The manner in which the bounding box of the text sequence 414 in the structural element 418 is represented is not limited. In one embodiment, the structural element 418 includes coordinates of the four corners of the bounding box surrounding the text sequence 414. Additionally, a confidence score associated with each of the coordinates may be included. In an alternative embodiment, the structural element 418 includes coordinates, height, and width in pixels of the bounding box surrounding the text sequence 414.

It should be noted that the plurality of structural elements 416 may be extracted by the server 220 from the layout information of the structured document 400, as a non-limiting example if the structured document 400 is a PDF or HTML file, and may be not performed at the same time or by the same model of OCR used to extract the plurality of text sequences 412.

The encoder-decoder network 310 receives as an input the plurality of text sequences 412 and the plurality of structural elements 416. It should be noted that the plurality of text sequences 412 and the plurality of structural elements 416 may be received at different times and/or from different electronic devices.

The encoder-decoder network 310 comprises an encoder network 320 and a decoder network 360.

Generally speaking, the encoder-decoder network 320 is a neural network architecture that that seeks to learn a reduced representation or encoding of the input for dimensionality reduction, preserving only information that is useful for decoding the target entities in the decoder network 360. In the present context, the encoder 320 seeks to learn from the plurality of text sequences 412 and the plurality of structural elements 416 of the structured document 400, a reduced representation from which it can understand semantic and spatial organization, which enables extracting textual entities therefrom.

Encoder Network

The encoder network 320 comprises a first CNN 330 and a second CNN 340.

First CNN

The first CNN 330 receives as an input the structured document 400 having the plurality of text sequences 412 and the plurality of structural elements 416.

The first CNN 330 is a 1D CNN. The first CNN 330 includes a plurality of 1D encoding layers 335, where each 1D encoding layer includes at least one 1D convolution layer (not depicted), and a pooling layer. The first CNN 330 performs convolutions via the at least one 1D convolution layer (not depicted) with a filter bank to produce a set of feature channels, and executes pooling via the pooling layer (not depicted) to reduce dimensionality of the feature maps.

Generally speaking, the first CNN 330 processes the structured document 400 through the plurality of 1D encoding layers 325 and encodes semantics of each given text sequence 414 and its respective structural element 418 to output the 3D encoded image 430. The first CNN 330 is configured to perform convolutions and max pooling on the plurality of text sequences 412 and the plurality of structural elements 416 to obtain the 3D encoded image 430, the 3D encoded image 430 is indicative of textual meaning, i.e. semantic characteristics, and of spatial structure, i.e. spatial characteristics, of at least a portion of the plurality of text sequences 412 and the plurality of structural elements 416.

In one embodiment, each 1D encoding layer 335 extracts information from shorter segments of a respective given text sequence 414, and capture meaning of segments in the given text sequence 414. In one embodiment, each 1D encoding layer 335 generates about 100 feature channels corresponding to a meaning of the given text sequence 414 inside the respective structural element 418. Thus, the given text sequence 414 in the 3D encoded image 430 is represented as a set of multi-channel features capturing the semantics of the given text sequence 414.

In one embodiment, each character in the text sequence 414 is embedded as a respective dense vector, which are combined to obtain the text embedding for the text sequence 414, where a size of the text embedding is based on the number of characters in the text sequence 414. As a non-limiting example, each dense vector may be of size 256, and the text embedding may be of size N×256 where N is the number of characters in the text sequence 414. The first CNN 330 applies 1D convolutions to pool across characters to obtain a fixed length embedding for each text sequence 414.

The first CNN 330 embeds each text sequence 414 separately to generate a respective fixed-length embedding in 1D for each respective structural element 418, and the respective fixed-length embedding of the text sequence 414 is positioned in 2D at a position corresponding to the position of the structural element 418 in the structured document 400 to generate the 3D structure of the 3D encoded image 430. The fixed-length embeddings of the plurality of text sequences 412 are then rearranged in 2D fashion to obtain the 3D encoded image 430. As a non-limiting example, the text sequence 414 including the word "Company" having the respective structural element 418 comprising coordinates x=212 and y=200 in the structured document 400 will be placed at corresponding coordinates x=212 and y=200 in the 3D encoded image 430 by the first CNN 330.

In one embodiment, the first CNN 330 may receive the plurality of text sequences 412 and the plurality of structural elements 416 as embedded representations, including character embeddings and/or word embeddings. The character embeddings and/or word embeddings may be generated by another MLA. Non-limiting examples of embedding algorithms includes GloVe, and word2vec, The first CNN 330 enables capturing a spatial layout or structure of the structured document 400 in an implicit manner in the 3D encoded image 430.

In one embodiment, the 3D encoded image 430 may be represented in the form of a tensor of dimension H×W×C where H is the height of the structured document 400, W is the width of the structured document 400, and C is the number of feature channels.

The first CNN 330 outputs the 3D encoded image 430.

Second CNN

The second CNN 340 receives the 3D encoded image 430.

The second CNN 340 is a 2D CNN. The second CNN 340 is configured to receive the 3D encoded image 430 and perform 2D convolutions on the 3D encoded image 430 to generate an aggregated feature vector 450.

The second CNN 340 comprises inter alia a plurality of 2D encoding layers 345, each 2D encoding layer 345 comprising at least one convolution layer, and a pooling layer. A given 2D convolution layer performs batch normalization and applies a non-linear activation function. The activation function present at every layer, is used to determine outputs of the 2D convolution layer. In one embodiment, the activation function may be a rectified linear unit (ReLU) activation function. A given pooling layer in the plurality of 2D encodings layers 345 learns to reduce the spatial size of the convolved features to decrease the computational power required to process the data via dimensionality reduction. The pooling layers enable extracting dominant features of the input, and thus obtain the aggregated feature vector 450. Generally, the first convolution layers in the plurality of 2D encodings layers 345 are configured to capture the low-level features of the 3D encoded image 430, and the subsequent 2D convolution layers are configured to capture the high-level features of the 3D encoded image 430 to obtain an overall understanding of the structure of the 3D encoded image 430 to generate the aggregated vector 450.

The second CNN 340 blends spatial characteristics of the given structural element 418 of the structured document 400, i.e. bounding boxes, with the text sequence 414, i.e. content of the bounding boxes by processing the 3D encoded image 430. As a non-limiting example, the second CNN 340 may capture that a first structural element comprising a text sequence "Parkway Drive" is to the right of a second structural element comprising a text sequence "Applicant Address", and infer that Parkway Drive is the applicant's address.

The second CNN 340 outputs the aggregated vector 450, the aggregated vector 450 representing high-level features and low-level features of the 3D encoded image 400, the aggregated vector 450 blending the spatial characteristics and the semantic characteristics of the document 400. It may be said that the aggregated vector 450 is indicative of a combination of the spatial characteristics and the semantic characteristics of the structured document 400.

Decoder Network

The decoder network 360 receives as an input the aggregated vector 450.

The decoder network 360 comprises a long short term memory (LSTM) network 370. A LSTM network 370 is a type of RNN that can learn and memorize long-term dependencies, and has a chain of repeating modules, with a repeating module comprising four NN layers, in contrast with a vanilla RNN which typically has a simpler structure e.g., a single tan h layer.

When an input sequence (such as a string of text) is fed into a normal forward LSTM layer, the output sequence for each timestep encodes information from that timestep as well as past timesteps. In other words, the output embedding for each sequence of characters will contain contextual information from sequences of characters that came before it.

Briefly speaking, a common LSTM network 370 is composed of a cell, an input gate, an output gate and a forget gate. The cell remembers values over arbitrary time intervals and the three gates regulate the flow of information into and out of the cell.

In other words, the cell is responsible for keeping track of the dependencies between the elements in the input sequence. The input gate controls the extent to which a new value flows into the cell, the forget gate controls the extent to which a value remains in the cell and the output gate controls the extent to which the value in the cell is used to compute the output activation of the LSTM unit. The activation function of the LSTM gates is often a logistic sigmoid function.

The LSTM network 370 enables processing sequences of data, in this context the aggregated vector 450 indicative of high-level and low-level features of the 3D encoded image 430, which blends spatial and semantic characteristics of structured document 400. The LSTM network 370 uses embeddings with a softmax attention mechanism to extract textual entities corresponding to entity categories. In one embodiment, the LSTM network 370.

In other words, The LSTM network 370 enables learning sequences encoded in the aggregated vector 450 to obtain an understanding of the entities and entity instances present in the structured document 400. Thus, the LSTM network 370, having been trained to learn and classify categories or designations in structured documents, e.g.: "name", "city", "address", "item", "weight" can infer the associated entities, e.g. "Company ABC inc.", "Quantum Lake", "666 Alphabet Street", "1200.00 lbs".

Further, the LSTM network 370 learns different formats for classifying entities, and due to its sequence-by-sequence learning nature, the LSTM network 370 may correct errors performed by the OCR model, e.g. the OCR model might transcribe the word logistics to 'L0gistics, and the LSTM network 370 may correct the word back to "logistics". The LSTM network 370 enables correcting such errors because it has been trained to output text sequences that are likely to be the entity of interest, i.e. the LSTM network 370 is less likely to output the text sequence "'L0gistics" because of the very low probability of finding such a sequence in the training data.

The decoder network 360 outputs a plurality of entities 480 in the structured document 400. The plurality of entities 480 consist of text strings, where the LSTM network 370

Training

Generally speaking, the 2D document extractor 300 is trained as a standard neural network. In one embodiment, the 2D document extractor 300 is trained using a variant of stochastic gradient descent and backpropagation.

The input of the training model comprises the OCR from an image and entity strings that should be extracted e.g., OCR bounding boxes and "123 Parkway Drive".

In one embodiment, the loss function is character-based such that the 2D document extractor 300 is scored at how well it predicts every character of the output. In one embodiment, a teacher forcing method that uses model output from a prior time step as an input may be used during training, i.e. the decoder 370 is told what the last character should have been when it's predicting each subsequent character.

In one embodiment, the LSTM network 370 is trained on a per-character cross-entropy loss function.

As a non-limiting example, the training and validation may be performed on a receipt dataset comprising about 100000 synthetic images and about 500 real images, an invoice data set (about 100000 training documents, about 2000 validation documents, and about 2000 testing documents), and an application form dataset (about 43228 training documents, 3000 validation documents, and 5000 testing documents).

In-use, the 2D document extractor 300 may receive as an input any text sequence and its corresponding structural element in a structured document, and optionally an indication of categories of entities to extract. The 2D document extractor 300 may then output the specified entities in the form of text strings.

Method Description

FIG. 5 depicts a flowchart of a method 500 of extracting a set of textual entities in accordance with non-limiting embodiments of the present technology.

In one embodiment, the server 220 comprises a processor 110 and a non-transitory computer readable storage medium such as the solid-state drive 120 and/or the random-access memory 130 storing computer-readable instructions. The processor 110, upon executing the computer-readable instructions, is configured to execute the method 500.

The method 500 begins at step 502.

In one embodiment, the server 220 executes an OCR model to extract the plurality of text sequences 412 and the plurality of structural elements 416 from the structured document 400.

STEP 502: receiving a plurality of text sequences having been extracted from a structured document by an optical character recognition (OCR) model At step 502, the server 220 receives the plurality of text sequences 412 having been extracted from the structured document 400 via an OCR model. In one embodiment, the structured document 400 includes at least one of: a table, a list, a paragraph, and a field. A given text sequence 414 in the plurality of text sequences 412 comprises one or more characters.

In one embodiment, the plurality of text sequences 412 are received from the database 230.

The method 500 advances to step 504.

STEP 504: receiving a plurality of structural elements, each structural element being indicative of a location of a respective text sequence in the document At step 504, the server 220 receives the plurality of structural elements 416, where the respective structural element 418 of the plurality of structural elements 416 is associated with a given text sequence 414. In one embodiment, the respective structural element 418 is indicative of a bounding box surrounding the respective text sequence 414.

In one embodiment, steps 504 and 506 are executed simultaneously.

The method 500 advances to step 506.

STEP 506: encoding the plurality of text sequences and the plurality of structural elements to obtain a 3D encoded image At step 506, the server 220 accesses the first CNN 330 to encode, via the plurality of encoding layers 325, the plurality of text sequences 412 and the plurality of structural elements 416 to obtain the 3D encoded image 430. The first CNN 330 is a 1D CNN comprising a plurality of encoding layers 335. The first CNN 330 processes the structured document 400, i.e. the plurality of text sequences 412 and the plurality of structural elements 416, through the plurality of 1D encoding layers 335 and encodes semantics of each given text sequence 414 and its respective structural element 418 to output the 3D encoded image 430.

In one embodiment, the first CNN 330 generates embeddings of the plurality of text sequences 412 i.e. character embeddings and/or word embeddings. In an alternative embodiment, the server 220 may acquire the character embeddings and the word embeddings from another MLA or electronic device upon providing an indication.

In one embodiment, each 1D encoding layer 335 extracts information from shorter segments of a respective given text sequence 414, and capture meaning of segments in the given text sequence 414. In one embodiment, each 1D encoding layer 335 generates about 100 feature channels corresponding to a meaning of the given text sequence 414 inside the respective structural element 418. The first CNN 330 encodes each text sequence 414 separately via the 1D encoding layers 335 to generate a respective fixed-length embedding in 1D for each respective text sequence 414, and the respective fixed-length embedding of the text sequence 414 is positioned in 2D, based on the respective structural element 418, at a position corresponding to the position of the respective text sequence 414 in the structured document 400. The first CNN 330 obtains the 3D encoded image 430.

The 3D encoded image 430 is indicative of textual meaning, i.e. semantic characteristics, and of a spatial structure, i.e. spatial characteristics, of at least a portion of the plurality of text sequences 412 and the plurality of structural elements 416.

The method 500 advances to step 508.

STEP 508: compressing the 3D encoded image to obtain an aggregated feature vector, the aggregated feature vector being indicative of a combination of spatial characteristics and semantic characteristics of the 3D encoded image At step 508, the server 220 accesses the second CNN 340. The second CNN 340 is a 2D CNN. The second CNN 340 blends spatial characteristics of the given structural element 418 of the structured document 400, i.e. bounding boxes, with the text sequence 414, i.e. content of the bounding boxes by compressing the 3D encoded image 430 to obtain the aggregated vector 450. The aggregated vector 450 representing high-level features and low-level features of the 3D encoded image 430.

The method 500 advances to step 510.

STEP 510: decoding the aggregated feature vector to extract an associated set of textual entities, a given textual entity being associated with at least one text sequence in the plurality of text sequences.

At step 510, the server 220 accesses the long short term memory (LSTM) network 370 to decode the aggregated feature vector 450 to extract a set of textual entities 480, where a given textual entity is associated with at least one text sequence 414 of the plurality of text sequences 412. The LSTM network 370 has been trained using a per-character cross-entropy function. The LSTM network 370 has been trained to associate entity instances with entities in one or more text sequences.

It should be noted that one or more of the set of textual entities may be associated with empty text sequences, in which case the LSTM network 370 outputs a blank.

The method 500 then ends.

It should be apparent to those skilled in the art that at least some embodiments of the present technology aim to expand a range of technical solutions for addressing a particular technical problem, namely extracting entities from a document using 2D information via artificial neural networks, which enables improving accuracy, optimizes computation time and saves computational resources compared to some state-of-the-art methods.

It should be expressly understood that not all technical effects mentioned herein need to be enjoyed in each and every embodiment of the present technology. For example, embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for extracting textual entities from a structured document, the method being executable by a server, the server executing a plurality of machine learning algorithms (MLAs) comprising a first MLA, a second MLA, and a third MLA, the method comprising:
  receiving, by the server, a plurality of text sequences having been extracted from an image by an optical character recognition (OCR) model having processed the image to generate the structured document;
  receiving, by the server, a plurality of structural elements, each structural element being indicative of a location of a respective text sequence of the plurality of text sequences in the structured document;
  encoding, by the first MLA, the plurality of text sequences and the plurality of structural elements to obtain a 3D encoded image, the 3D encoded image being indicative of semantic characteristics of the plurality of text sequences, the 3D encoded image having a spatial structure of the structured document;
  compressing, by the second MLA, the 3D encoded image to obtain an aggregated feature vector, the aggregated feature vector being indicative of a combination of spatial characteristics and semantic characteristics of the 3D encoded image; and
  decoding, by the third MLA, the aggregated feature vector to extract an associated set of textual entities, a given textual entity being associated with at least one text sequence in the plurality of text sequences.

2. The method of claim 1, wherein
  the first MLA comprises a first convolutional neural network (CNN);
  the second MLA comprises a second CNN; and wherein
  the third MLA comprises a third recurrent neural network (RNN).

3. The method of claim 2, wherein
  the first CNN comprises a 1D CNN; wherein
  the second CNN comprises a 2D CNN; and wherein
  the third RNN comprises a Long Term Short Memory (LSTM) network.

4. The method of claim 3, wherein during the encoding, a given 1D convolution layer in the first CNN generates, for a given text sequence in the structured document, a respective fixed-length embedding, the respective fixed-length embedding comprising a plurality of feature channels indicative of semantic characteristics of the given text sequence.

5. The method of claim 4, wherein the first CNN rearranges the respective fixed-length embeddings based on the plurality of structured elements to obtain the 3D encoded image.

6. The method of claim 5, wherein
  the method comprises, prior to the encoding the plurality of text sequences:
    embedding the plurality of text sequences to obtain at least one of: character embeddings and word embeddings of the plurality of text sequences; and wherein
  the encoding comprises:
    pooling, by the first MLA, the at least one of the character embeddings and the word embeddings to generate the respective fixed-length embeddings.

7. The method of claim 1, wherein the method further comprises, prior to the receiving:
  training the first MLA, the second MLA, and the third MLA using stochastic gradient descent and back propagation.

8. The method of claim 7, further comprising: training the third MLA on a per-character cross-entropy function.

9. The method of claim 1, wherein each structural element comprises coordinates of a bounding box, the bounding box comprising the respective text sequence.

10. The method of claim 9, wherein the aggregated feature vector is indicative of high-level features and low-level features of the 3D encoded image.

11. A server for extracting textual entities from a structured document, the server having access to a plurality of machine learning algorithms (MLAs) comprising a first MLA, a second MLA, and a third MLA, the server comprising:
  a processor;
  a computer-readable storage medium connected to the processor, the computer-readable storage medium comprising instructions;
  the processor, upon executing the instructions, being configured for:
    receiving a plurality of text sequences having been extracted from the structured document by an optical character recognition (OCR) model having processed the image to generate the structured document;
    receiving a plurality of structural elements, each structural element being indicative of a location of a respective text sequence in the document;
    encoding, by the first MLA, the plurality of text sequences and the plurality of structural elements to obtain a 3D encoded image, the 3D encoded image being indicative of semantic characteristics of the plurality of text sequences, the 3D encoded image having a spatial structure of the structured document;
    compressing, by the second MLA, the 3D encoded image to obtain an aggregated feature vector, the aggregated feature vector being indicative of a combination of spatial characteristics and semantic characteristics of the 3D encoded image; and
    decoding, by the third MLA, the aggregated feature vector to extract an associated set of textual entities, a given textual entity being associated with at least one text sequence in the plurality of text sequences.

12. The server of claim 11, wherein
  the first MLA comprises a first convolutional neural network (CNN);
  the second MLA comprises a second CNN; and wherein
  the third MLA comprises a third recurrent neural network (RNN).

13. The server of claim 12, wherein
  the first CNN comprises a 1D CNN; wherein
  the second CNN comprises a 2D CNN; and wherein
  the third RNN comprises a Long Term Short Memory (LSTM) network.

14. The server of claim 13, wherein during the encoding, a given 1D convolution layer in the first CNN generates, for a given text sequence in the structured document, a respective fixed-length embedding, the respective fixed-length embedding comprising a plurality of feature channels indicative of semantic characteristics of the given text sequence.

15. The server of claim 14, wherein the first CNN rearranges the respective fixed-length embeddings based on the plurality of structured elements to obtain the 3D encoded image.

16. The server of claim 15, wherein
the processor is further configured for, prior to the encoding the plurality of text sequences:
embedding the plurality of text sequences to obtain at least one of: character embeddings and word embeddings of the plurality of text sequences; and wherein
the encoding comprises:
pooling, by the first MLA, the at least one of the character embeddings and the word embeddings to generate the respective fixed-length embeddings.

17. The server of claim 16, wherein the processor is further configured for, prior to the receiving:
training the first MLA, the second MLA, and the third MLA using stochastic gradient descent and back propagation.

18. The server of claim 17, wherein processor is further configured for: training the third MLA on a per-character cross-entropy function.

19. The server of claim 18, wherein the first CNN generates at least a portion of the encoding on a character-per-character basis.

20. The server of claim 19, wherein each structural element comprises coordinates of a bounding box, the bounding box comprising the respective text sequence.

* * * * *